Nov. 19, 1940.   R. O. BEARDSLEY ET AL   2,222,165
COMPARATOR
Filed Oct. 10, 1938
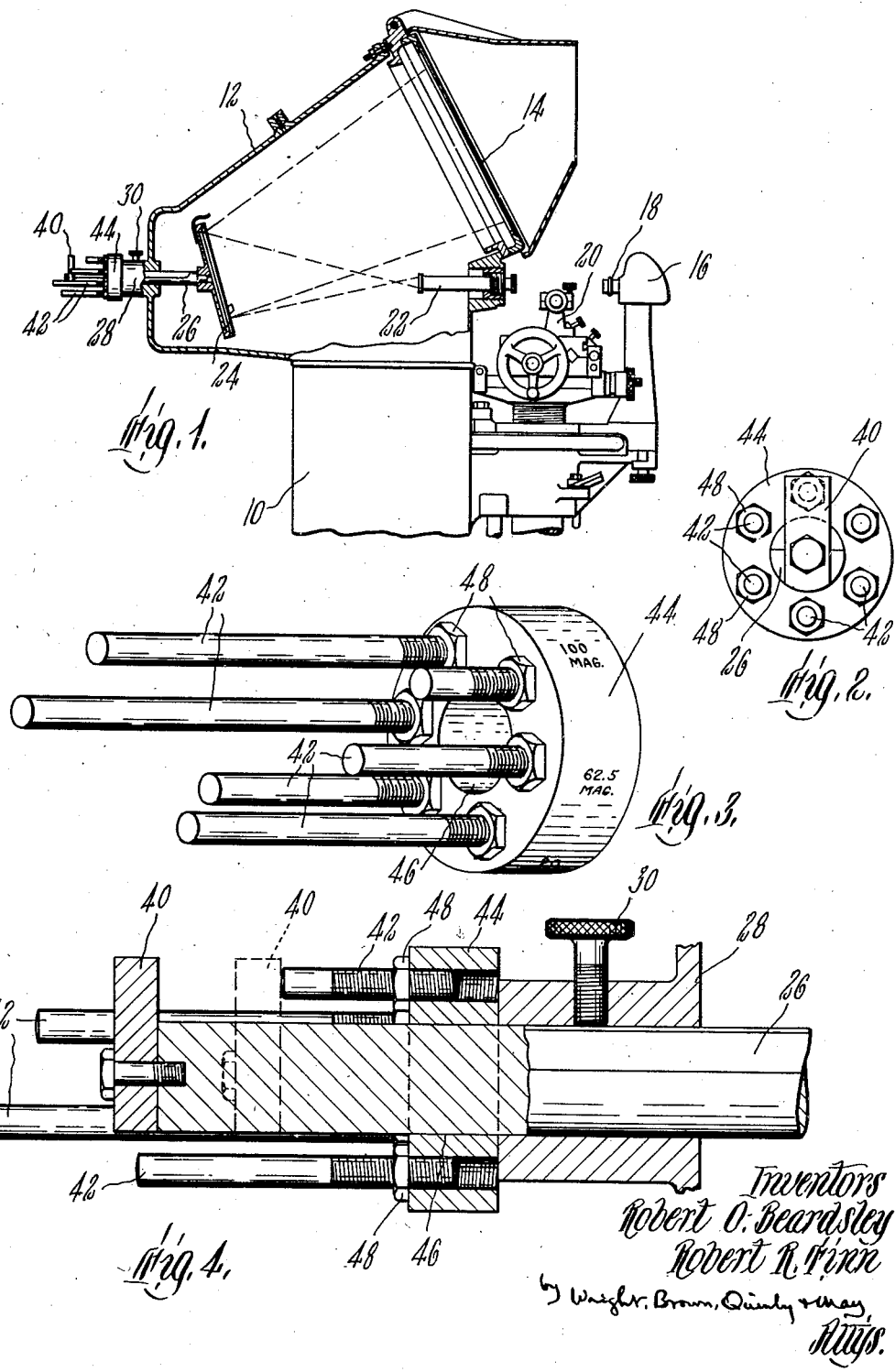
Inventors
Robert O. Beardsley
Robert R. Finn Patented Nov. 19, 1940

2,222,165

UNITED STATES PATENT OFFICE 2,222,165

COMPARATOR

Robert O. Beardsley and Robert R. Finn, Springfield, Vt., assignors to Jones & Lamson Machine Company, Springfield, Vt., a corporation of Vermont Application October 10, 1938, Serial No. 234,076

2 Claims. (Cl. 88—24)

This invention relates to improvements in comparators of the kind described and illustrated in United States Letters Patent No. 2,035,780. Apparatus of this kind includes a translucent screen on which a shadow image of an object to be tested is thrown for comparison with a standard outline. To this end, a pencil of parallel light rays, conveniently produced by a lamp and a condensing lens, is projected past a portion of the object to be tested so that a shadow image of that portion results. The light beam is then passed through a microscope which casts an enlarged image on a suitably placed screen. By using microscopes of different power, different degrees of magnification of the image can be had, but, as it is practically impossible to construct lens systems having the same focal length, the optical distance between the microscope and the screen must be adjusted to obtain the exact desired degree of magnification.

In the comparator described and illustrated herein, the screen is mounted in a fixed position above the microscope, the beam of light from the microscope being reflected back to the screen by means of a suitable mirror. Thus the optical path from the microscope to the screen can be changed by moving the mirror toward or from the microscope and screen. It is an object of the present invention to provide apparatus by which the position of the mirror can be quickly and accurately adjusted to various positions to obtain the precise degrees of magnification from different microscopes which are supplied for use in the comparator.

According to the invention, the mirror is mounted on a shaft which is longitudinally slidable through an aperture in the casing in which the mirror is housed. On the outside of the casing are a number of stops engageable by a lug on the mirror shaft to determine various positions of the mirror. These stops are adjusted to positions corresponding to different microscopes which can be used interchangeably in the apparatus for images of various degrees of magnification.

For a more complete understanding of the invention, reference may be had to the description thereof which follows, and to the drawing of which—

Figure 1 is a side elevation of a comparator of the pedestal type, a portion being broken away to show in section.

Figure 2 is an end elevation on a larger scale of the stop assembly shown in Figure 1.

Figure 3 is a perspective view of spacing means shown in Figures 1 and 2.

Figure 4 is an enlarged sectional view of the stop assembly.

In Figure 1 is illustrated the upper portion of a pedestal type comparator, including an upright standard 10 on the upper end of which is mounted a casing 12. On the casing 12 is a stationary screen 14 on which images of objects to be tested may be cast. For this purpose, a suitable source of light is provided in a lamp house 16, a condensing lens 18 being employed to project a pencil of parallel rays past a portion of an object to be tested which may be mounted upon a suitable carriage 20. The beam of light from the lens 18 passes through a suitable microscope 22 which is mounted on a suitable mounting in the casing 12 so as to project therethrough, this microscope being conveniently mounted below the screen 14. The light beam which passes through the microscope is reflected to the screen by a suitable mirror 24. This mirror is mounted upon a shaft 26 which projects through an aperture in a boss 28 on the rear portion of the casing. The shaft is preferably keyed or splined within this aperture so as to prevent rotation thereof but to permit longitudinal movement thereof with the mirror 24. The set-screw 30 is provided to secure the shaft and mirror in any desired position of adjustment. The microscope 22 and the screen 14 are preferably stationary so that the mirror 24 is employed to vary the optical distance between the microscope and the screen for the purpose of obtaining the desired degree of magnification of the image on the screen.

Microscopes of different magnifying power may be selectively employed to produce varying degrees of magnification according to the nature of the object to be tested. Comparators of the type described are made and sold equipped with a set of microscopes having different standard degrees of magnifying power. It is an object of the present invention to facilitate the adjusting of the mirror whenever the microscope 22 is replaced by a different microscope so that this can be done quickly and accurately to obtain the exact degree of magnification desired.

According to the invention, stop elements are provided by which the position of the mirror 24 can be quickly and accurately determined in accordance with any one of a number of microscopes. As shown, a stop lug 40 is secured to the outer end of the shaft 26, the mirror 24 being mounted upon the inner end of the shaft. A plurality of abutment elements are also provided to be selectively engageable by the lug 40 so as to stop the shaft and mirror accurately in predetermined positions. These abutment elements may consist of rods 42 which are screw-threaded into a collar 44. The collar is provided with a central aperture 46 through which the shaft 26 extends, the collar abutting the outer end face of the boss 28 as indicated in Figure 4. The rods 42 are arranged in circular array and are all parallel to the shaft 26. Each rod is screw-threaded into the collar 44 so that it may be rotated for small longitudinal adjustments relative to the collar. Each rod is provided with a lock nut 48 by which it may be firmly locked in adjusted position. The stop assembly, consisting of the collar 44 and the rods 42, is relatively rotatable about the axis of the shaft 26 so as to present any selected one of the rods 42 for engagement by the lug 40, but, if desired, the lug could be made to swing around the axis of the shaft. The periphery of the collar 44 may be marked to indicate the individual rods which correspond to the variously powered microscopes intended for use in the comparator. When the microscope 22 is replaced by another of different power, the operator releases the set-screw 30 and moves the shaft 26 out until it is beyond the longest rod 42. The collar 44 is then turned until the rod which corresponds to the microscope to be used is in the path of movement of the lug 40. The shaft and mirror are then moved toward the microscope until the lug abuts the end of the selected rod 42. The set-screw 30 is then set up to secure the shaft 26 and mirror 24 in their newly adjusted position. Since the collar 44 abuts the outer face of the boss 42, the stop assembly acts as a variable spacing device to determine the distance between the lug 40 and the outer face of the boss 28. Since the position of the latter is constant with respect to the screen and microscope, the adjusted positions of the mirror 24 can be definitely determined by use of the stop assembly as described.

It is evident that various modifications and changes may be made in the embodiment of the invention herein shown and described without departing from the spirit or scope thereof as defined in the following claims.

We claim:

1. In combination with a comparator having a casing with a screen and a mounting for a microscope thereon, a plurality of microscopes of different magnifying power selectively mountable in said mounting, a mirror within said casing arranged to reflect to said screen light entering through a microscope mounted on said mounting, and means for adjustably moving said mirror toward and from said mounted microscope to vary the length of the optical path from the microscope to the screen; a stop element movable with said mirror, a series of abutment elements selectively engageable by said stop element, said abutment elements being supported by said casing at fixed distances from the microscope mounting, said distances being so related to the magnifying powers of respective said microscopes as to effect predetermined degrees of magnification of images cast on the screen when said stop element is in engagement with the abutment element which corresponds to the microscope mounted in said mounting, and means for securing said mirror in adjusted position.

2. In a comparator, a casing having a boss with an aperture therethrough, a shaft extending through said aperture and having an inner portion within the casing and an outer portion outside of the casing, means on said shaft and boss for preventing rotation of said shaft in said aperture, a mirror mounted on the inner end of said shaft, a lug mounted on the outer end of said shaft and projecting laterally therefrom, spacing means engageable by said lug for determining longitudinal positions of said shaft, said spacing means including a collar surrounding said shaft and abutting the outer face of said boss and a plurality of stop rods mounted on said collar parallel to said shaft, said collar being rotatable about said shaft to move said rods selectively into the path of said lug, and means for securing said shaft in adjusted position.

ROBERT O. BEARDSLEY.
ROBERT R. FINN.